June 23, 1925.
G. F. HARRELL
1,543,380
MEANS FOR FORMING AND BAKING PASTRY CRUSTS
Filed June 9, 1923
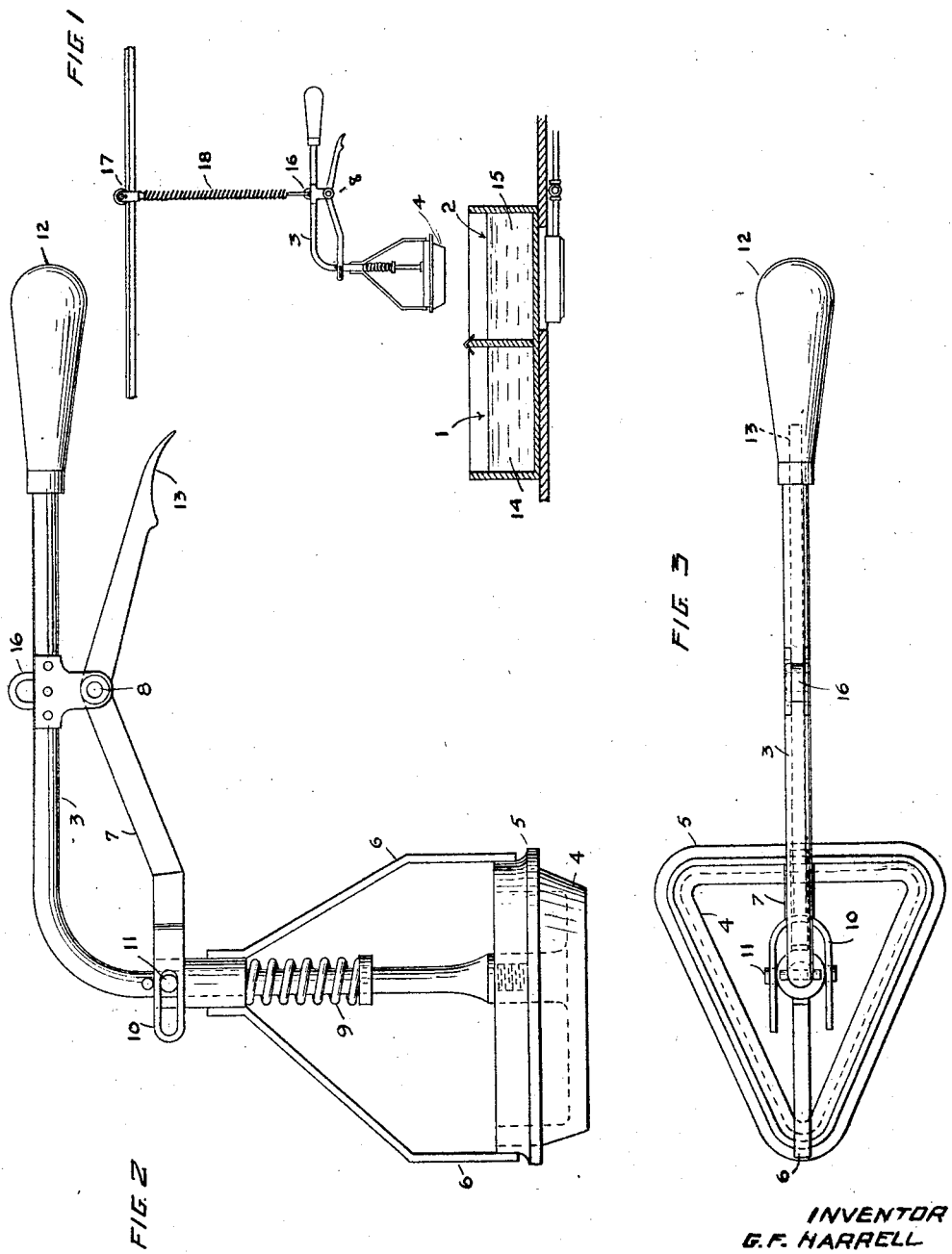
INVENTOR
G. F. HARRELL
BY
ATT'Y Patented June 23, 1925.

1,543,380

UNITED STATES PATENT OFFICE.

GEORGE F. HARRELL, OF OAKLAND, CALIFORNIA.

MEANS FOR FORMING AND BAKING PASTRY CRUSTS.

Application filed June 9, 1923. Serial No. 644,358.

*To all whom it may concern:*

Be it known that I, GEORGE F. HARRELL, a citizen of the United States, residing at Oakland, in the county of Alameda and State of California, have invented a new and useful Improvement in Means for Forming and Baking Pastry Crusts, of which the following is a specification.

My invention relates to improvements in means for forming or shaping pastry crusts by means of molds and baking the same thereon or therein before removal therefrom, and has for a principal object the provision of means whereby the crust material, preferably prepared in the form of a paste, is first caused to adhere or set to a mold, or is formed within one, and the paste-form and mold together transferred to a properly constituted baking medium. While this medium as herein shown is that of a fat brought to a baking temperature, it is obvious that other baking means may be provided, as, for instance, a convenient form of oven, or the mold may be arranged to carry internally an electric heating unit. Whatever the means used for this purpose, the product thus obtained will be fresh and crisp, and freed from the contamination incident to the manipulation ordinarily practiced in the preparation of this class of food products.

In the accompanying drawings, forming a part of this specification and in which similar parts are designated by like characters of reference, throughout, Figure 1 is a view of the device as arranged for operation; Figure 2 a view in elevation, and Figure 3 a plan view.

Referring more particularly to the drawings, 1 represents a source from which paste is supplied for the formation of the molded crusts, 2 the source of heat by means of which the baking is accomplished, 3 the member bearing the mold, 4 the mold, 5 a member adapted to slidably girdle mold 4 and operating for the removal therefrom of molded formations, 6 arms borne by and slidably securing the member 5 to the member 3, 7 a lever pivotally attached to member 3 at point 8 and operating to move downward the arms 6 and compress the spring 9 through the action of its bifurcated and slotted extremity 10 in connection with the pin 11 carried by the member 3, 12 and 13 fashioned extremities respectively of member 3 and lever 7 affording means whereby the device is manipulated and controlled, 14 and 15 sources respectively of paste and heat supplies, 16 a suspension member bearing a slidable element 17, and 18 a spring element securing the device to the slidable element 17.

In the embodiment of my invention as herein presented, the operation is as follows:

Assuming that both paste and heat have been arranged for, the mold 4 is first transferred to the source of heat 2 and there permitted to remain until such a degree of temperature has been attained as will cause the paste brought into contact with its surface to adhere thereto and set. Following this, the mold is transferred to the paste receptacle 1 and allowed to remain therein, immersed to the desired depth, until a coating of sufficient thickness has been secured, after which it is again returned to the heat-source 2 to complete the baking. Having completed the baking, the mold and crust are removed from 2 and the crust detached from the mold through compressive action exerted upon the extremities 12 and 13, respectively, of member 3 and lever 7, this action operating to cause the member 5 to move downwardly over the surface of mold 4 removing therefrom the adhering crust and compressing the spring 9, whose release serves to restore 5 to its normal position.

While the embodiment and application of my invention, as herein shown, is the preferred one, it is obvious that there are other arrangement of parts and applications that may be made use of, without in the least departing from the spirit of my invention.

Having thus described my invention, what I claim and desire to secure by Letters Patent is:

1. In a device for making pastry crusts, the combination with a source of pastry supply, of a pastry mold, means for heating said mold, a handle for said mold, a supporting guide for said handle whereby the mold may be moved to and fro from said source of pastry supply, and means carried by said handle and operating against the exterior of said mold for removing the pastry crust formed thereon.

2. The combination, in a device of the character described, a member bearing a mold, an element slidable over the surface of said mold, arms slidably securing said element to said member, a pivoted lever secured to said member for imparting the necessary movement to said element, a spring borne by said member operating to return said element to normal position, and properly fashioned adjacent extremities of said member and said lever affording operative means whereby the said slidable element is caused to move over the surface of said mold.

3. The combination with a pastry mold, of means for removing baked pastry therefrom, said means comprising a handle member attached to said mold, a slidably mounted mold encircling member, and means mounted on said handle for moving the encircling member over the surface of the mold to remove the pastry adhering thereto.

GEORGE F. HARRELL.